April 9, 1957 F. E. ULLMAN ET AL 2,788,027
MEANS FOR AND METHODS OF FILLING CONTAINERS
Filed Jan. 14, 1954 2 Sheets-Sheet 1
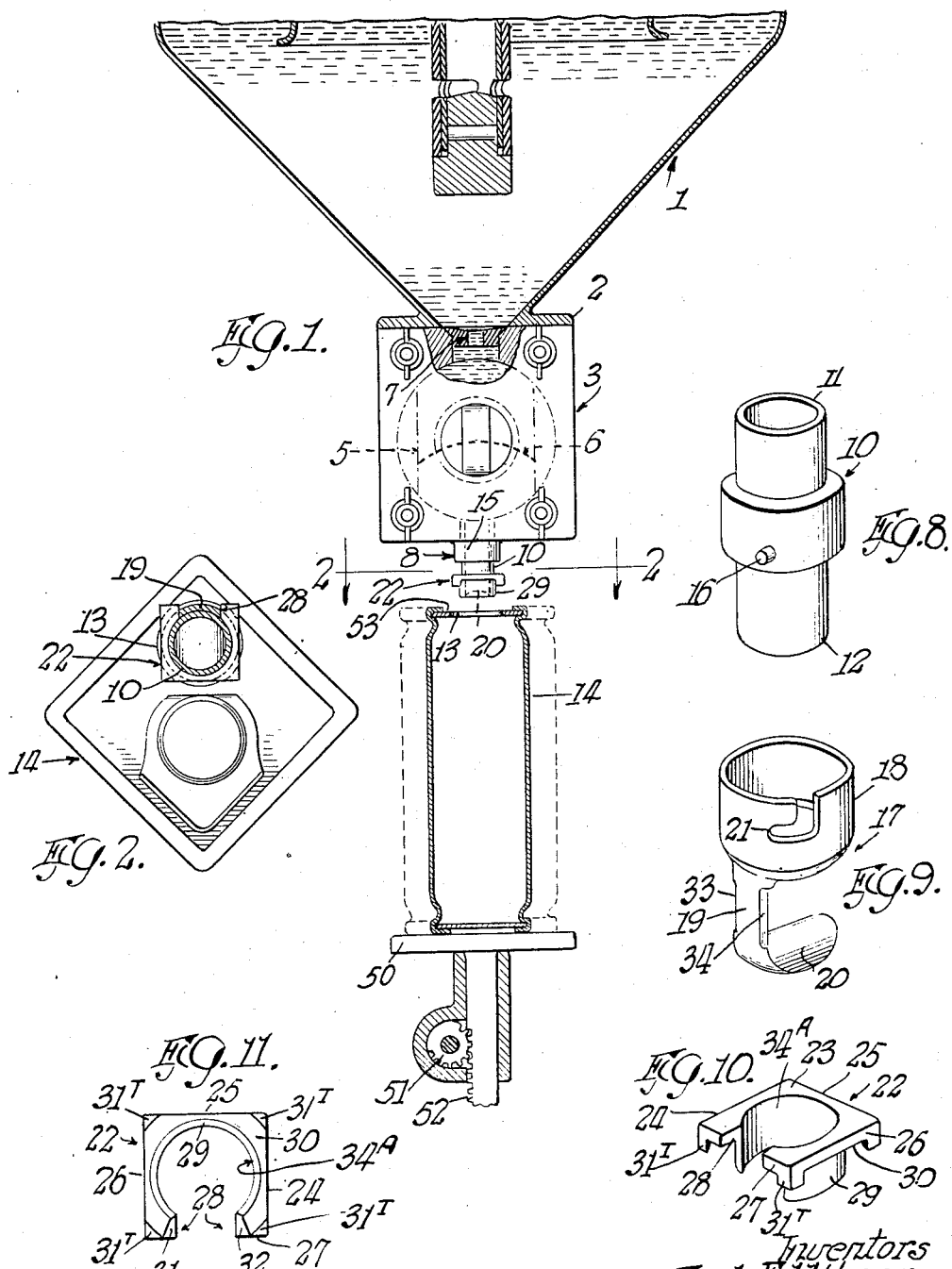
Inventors
Fred E. Ullman
Norman A. Virta April 9, 1957 F. E. ULLMAN ET AL 2,788,027
MEANS FOR AND METHODS OF FILLING CONTAINERS
Filed Jan. 14, 1954 2 Sheets-Sheet 2
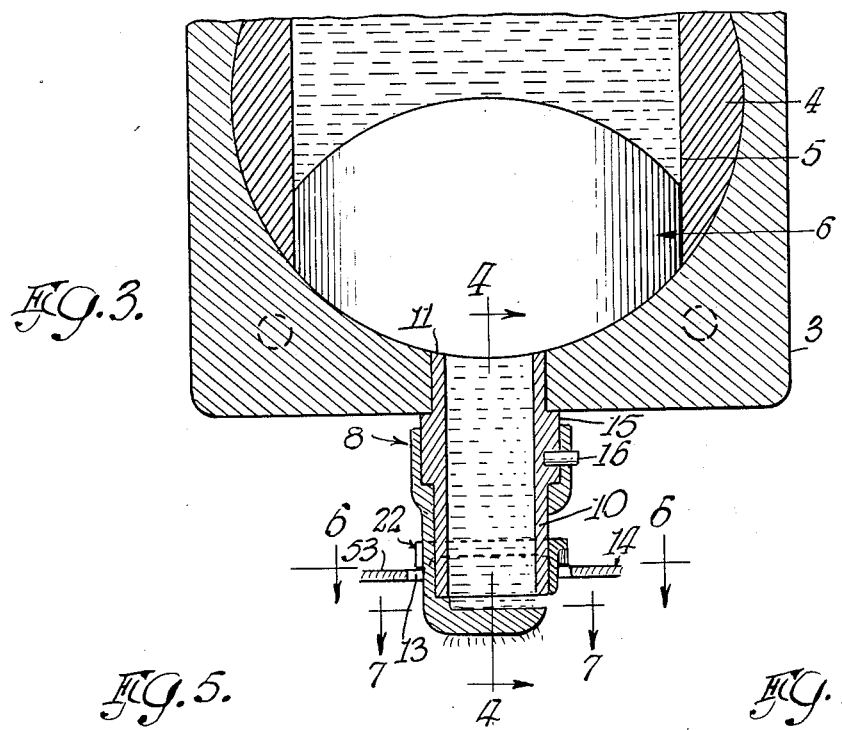
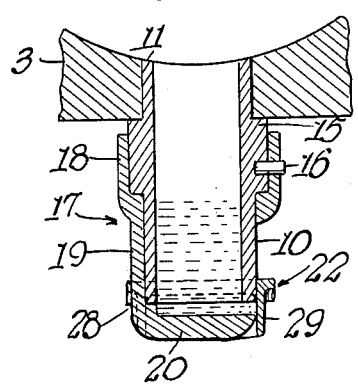
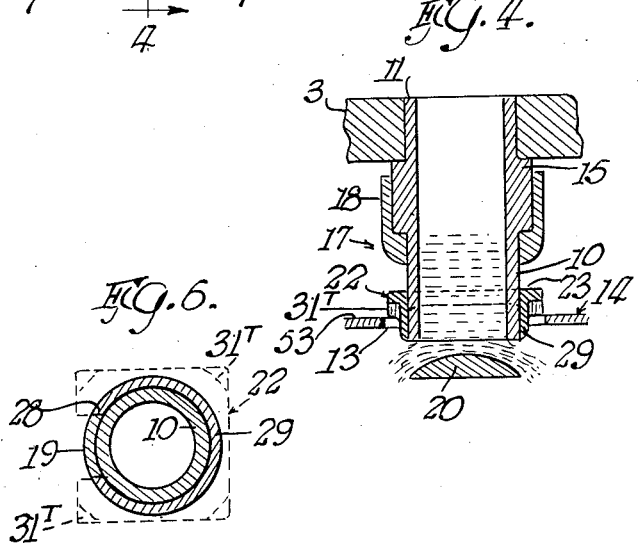
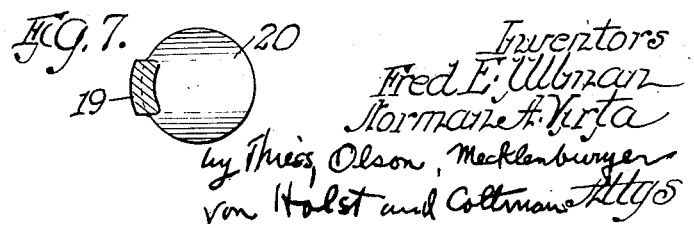

United States Patent Office 2,788,027
Patented Apr. 9, 1957

2,788,027

MEANS FOR AND METHODS OF FILLING CONTAINERS

Fred E. Ullman, Winnetka, and Norman A. Virta, Mount Prospect, Ill., assignors to Triangle Package Machinery Company, Chicago, Ill., a corporation of Illinois Application January 14, 1954, Serial No. 403,983

8 Claims. (Cl. 141—1)

This invention refers to certain new and useful improvements in means for and methods of filling containers, of which the following is a specification.

The invention relates generally to means for and methods of filling containers, but relates more particularly to an improved nozzle construction and methods of actuating the same.

In machines for filling containers with liquid, of which milk is an example, it is necessary to have a nozzle discharge area of such size as will permit the discharge of a relatively large volume of liquid per unit of time. At times a quantity of liquid may be retained in the discharge nozzle between the control valve and the end of the nozzle when the container and nozzle are separated after a filling operation. Because of the magnitude of the discharge area at the nozzle end the surface tension of the liquid cannot be relied upon to retain this liquid against discharge after separation of the container and nozzle. As a result the trapped liquid at times discharges upon the outer part of the container upon the machine parts prior to the arrival of another container in position for filling, and in some instances into the next following container.

An object of the invention is to provide a method and means whereby the aforesaid undesirable result can be prevented.

Another object of the invention is to provide a method and means to reduce the discharge area upon completion of a filling operation to one wherein the surface tension of the liquid retained in the discharge nozzle will be effective to prevent the discharge of such retained liquid until a larger area is again established in the course of a subsequent filling operation.

It is also an object of our invention to provide simple and inexpensive means for the control of the discharge area of a filling tube or nozzle and which can be operated for long periods without causing trouble.

Again it is an object of the invention to provide a method for the control of the discharge area of the filling tube or nozzle and which can be manipulated by the relative movement of the container to and from the filling tube or nozzle.

For the purposes of this application we have shown our invention in its adaptation to a machine for filling containers with milk. Such disclosure, however, is purely illustrative and in no way limiting since the principles of our invention apply to a variety of machines.

The manner in which the desired results are produced and the advantages thereof will be more fully understood by reference to the accompanying drawings, which illustrate a preferred embodiment of our invention.

In the drawings:

Fig. 1 is a view in side elevation of the improved filling nozzle embodying the preferred form of the invention, as employed in connection with a machine for filling containers with a liquid, such as milk, certain of the parts being broken away for illustrative purposes.

Fig. 2 is a horizontal sectional view through a part of the improved nozzle, as taken on the line 2—2 and on a scale enlarged over that of Fig. 1.

Fig. 3 is a fragmentary vertical sectional view through the nozzle on a scale enlarged over that of Fig. 1, showing the parts of the nozzle in the position they occupy in a container filling operation.

Fig. 4 is a fragmentary vertical sectional view through parts of the nozzle as taken on the line 4—4 of Fig. 3.

Fig. 5 is a view similar to Fig. 3 with the parts of the nozzle in the position they assume at the end of a carton filling operation.

Figs. 6 and 7 are detail horizontal sectional views through parts of the nozzle as taken on the lines 6—6 and 7—7 respectively of Fig. 3.

Figs. 8, 9 and 10 are detail views in perspective of the parts making up the improved nozzle and which will be described in more detail later on, and Fig. 11 is a bottom plan view of the member shown in Fig. 10.

We have indicated at 1 a hopper or reservoir for the maintenance of a quantity of a liquid to be supplied to the container to be filled. Liquid is supplied to the reservoir in any suitable manner.

The hopper 1 terminates in a portion 2 which rests upon the valve casing of a valve structure 3 which is suitably supported and held in fixed position by means not shown.

Various kinds of valve means may be employed which will serve to receive a measured quantity of liquid and periodically position the same for discharge through the nozzle which deposits the liquid in the container, the construction of which is such that a quantity of liquid may be trapped at times in that portion of the discharge nozzle below the valve.

As here shown the valve structure 3 includes a rotatable cylinder 4 having a transverse bore 5 therein. Mounted in the bore 5 is a floating piston 6 which moves from end to end of the bore upon rotation of the cylinder. The action is such that a measured quantity of liquid flows from the hopper 1 into the bore of the cylinder through the inlet orifice 7. As the cylinder 4 rotates the charge of liquid is forced out through the discharge nozzle 8 by the movement of the floating piston 6.

Cross reference is hereby made to applicants' copending application Serial No. 403,981, filed of even date herewith, which describes and claims the valve structure 3 and the method of controlling the speed of the floating piston therein whereby the velocity of the liquid discharging through the discharge nozzle is controlled. The present application and the invention herein disclosed relates more particularly to the nozzle construction and its cooperation with valve measuring means.

*The structure of the discharge nozzle*

The discharge nozzle includes a tube 10, the upper end 11 of which is secured in the valve casing and periodically communicates with the liquid containing bore in the valve cylinder. The lower end 12 is adapted to extend into the filler opening 13 of the container 14.

Intermediate the upper and lower ends of the tube 10 is an annular shoulder 15 from which projects a radially disposed pin 16. Telescoping over the tube 10 is a liquid spreading member 17, best shown in Fig. 9. It comprises an upper tubular portion 18, and a downwardly extending portion 19, the latter terminating in a transversely disposed tongue-like part 20.

The tubular portion 18 of the member 17 is provided with a bayonet slot 21 whereby when the member 17 is telescoped over the nozzle tube 10 and partially rotated locking of the parts is effected.

The nozzle assembly is completed by the addition of the member 22, best shown in Figs. 10 and 11. The member 22 is generally square in shape at the top, having a flat upper face portion 23 and perpendicular side faces 24, 25 and 26 and 27. The side 27 is cut away to provide a vertical slot 28. The upper surface of the member 22 is flat. Projecting downwardly from the upper part of the meber is a substantially cylindrical portion 29 also cut away vertically to form a vertical slot therein. The member is formed with a lower plane surface 30 where the upper outer wall of the tubular portion 29 terminates and merges therewith. At each corner of the member 22 is a triangular portion 31T which projects downwardly a slight distance below the plane of the surface 30 but considerably short of the lower end of the cylindrical portion 29.

Material is also cut away at the sides of the slot 28 to provide horizontal triangular areas 31 and 32, the plane of which is slightly higher than the plane of the surface areas 30. We are assuming the member 22 is in its operative position on the nozzle, Fig. 11, showing the member inverted, but better illustrating the particular features presently being described.

It will be understood the upper end 11 of the member 10 is secured in the casing of the valve 3. The parts 17 and 22 may conveniently be assembled on the part 10 in the following manner.

Telescope the upper end 18 of member 17 over the lower portion of the member 10 until the upper end of the cutaway portions 33, 34 are about on a level with the lower end 12 of the member 10. Then move the member 22 horizontally with the flat face up and with the slot 28 facing the portion 19 of the member 17. Continue this movement until the bore 34A of member 22 is aligned with the outer wall surface of the lower end of member 10. Then move member 17 upward so that the pin 16 enters the bayonet slot 21 and rotate slightly to lock parts 10 and 17 together. At this time the member 22 will be held in position so that it may slide up and down on the lower tubular part of member 10. The up and down movement of the member 22 is limited by the length of the cut-back portions 33 and 34 along the vertical edges of portion 19.

When in its lowermost position parts of the triangular areas 31 and 32 of member 22 engage the offset shoulders at the bottom of the portions 33 and 34 of part 19, at which time the cylindrical portion 29 surrounds all of the exposed annular area of the nozzle, as illustrated in Figs. 1 and 5.

The shoulders at the upper ends of portions 33 and 34 limit the upward movement of the member 22.

*The operation of the device*

Assume the parts to be in the position shown in Figs. 1 and 5, at which time member 22 will be in its lower position, closing the area through which the liquid is to discharge in a container filling operation. The container 14 is positioned with its opening 13 in vertical alignment with the nozzle. The table 50 is then raised by means of the pinion 51 and gear rack 52, the pinion 51 being driven in any suitable manner.

Continued movement engages the top or end wall 53 of the container with the depending triangular projections at the four corners of the member 22, thereby lifting the member 22 to the position shown in Figs. 3 and 4. It will be seen at this time the discharge area at the lower end of the discharge tube 10 has been uncovered so that the liquid may flow therethrough and into the container.

The curved upper surface of the tongue-like part 20 of member 19 serves to spread or deflect the milk outwardly toward the sides of the container and to some extent reduce the tendency of the liquid to foam as it discharges into the container.

In a nozzle construction of the type described, and without the member 22, there is a tendency at times for some liquid, at the end of a filling operation, to remain in the tubular portion 10. Then, as the carton is withdrawn from the nozzle, at times this trapped liquid discharges so as to spill over the container and not through the filling opening.

In a multiple stage filling operation where successive containers are moved into position, each station filling only part of the container, the retained liquid may spill on the machine, upon the next following container, or even be deposited in the next following container. In the latter case the previous container would not contain the desired amount of liquid and the following container would receive too much. In any event, there is always danger of spilling the liquid on the containers or on the machines, thereby causing undesired and unsanitary conditions.

However, by providing the slidable member 22, as soon as relative separation between container and nozzle starts after a filling operation, the member 22 slides down over and closes the nozzle discharge area, i. e. the area between the upper curved surface 20 and the bottom of tube portion 12. The fit of the member 22, while relatively loose so that it will slide freely, is sufficiently tight that the surface tension of any liquid that may be trapped in the discharge nozzle below the valve will not flow out until the member 22 is raised. As explained, this can only occur when another container top again engages the member 22 for the filling of another container.

The machine is of simple construction comprising relatively few parts, which can be readily maintained in sanitary condition. This is an important aspect since machines of this type are used extensively for filling containers with milk, orange juice and other products for human consumption where sanitation is necessary.

We claim:

1. The process of filling containers with liquid, comprising providing a conduit having inlet and outlet ends, periodically charging into the inlet end of said conduit measured quantities of liquid for discharge through the outlet end while the outlet end presents an outlet area of a predetermined magnitude and under such conditions that at times a quantity of liquid is trapped in the conduit, but not securely retained therein at the end of a charging operation, reducing the discharge area of the outlet end of the conduit between charging operations to such smaller magnitude that the surface tension of the trapped liquid tending to flow through said reduced area responsive to gravitational force is effective to prevent flow, and in again restoring the initial larger area at the discharge end concurrent with a subsequent charging operation.

2. Apparatus for filling containers with liquid, comprising in combination means forming a conduit having inlet and outlet ends, means for periodically charging into the inlet end of the conduit measured quantities of liquid for discharge through the outlet end, said outlet end being formed with a fixed discharge area of such magnitude that at times a quantity of liquid is trapped, but not securely retained, in the conduit against gravitational flow at the end of a charging operation, and means for reducing the fixed discharge area of said conduit to such smaller size that the surface tension of the trapped liquid tending to flow through the outlet responsive to gravitational force is sufficient to prevent flow.

3. The combinaion set forth in claim 2, in which the means for reducing the area of the outlet end of the conduit comprises a member movable downwardly from an elevated position solely responsive to gravitational force, thereby effecting reduction of outlet area.

4. The combination set forth in claim 2, in which the outlet end of the conduit includes spreader means positioned transversely of the outlet end, but in spaced relation to provide a discharge gap around at least a part of the outlet end, and the means for changing the area of this gap comprises a member slidable vertically of the discharge end of the conduit between positions uncovering said gap and partially closing the gap.

5. The combination set forth in claim 2, in which the outlet end of the conduit includes spreader means supported from the conduit proper in a position transversely of the outlet end, but in such spaced relation thereto as to provide a radial gap throughout a substantial part of the end of the outlet, and the means for reducing the discharge area includes a floating member vertically movable in a guided path by engagement with means carried by the conduit structure.

6. The combination set forth in claim 2, in which the outlet end of the conduit includes spreader means supported in alignment with the axis of the conduit but spaced from the end thereof to form a partially annular gap and the area reducing means comprises a partial annulus concentric with the conduit and movable between positions fully exposing said gap and partially closing the same.

7. In an apparatus for preventing the gravitational flow of liquid through the discharge opening of a container-filling nozzle in communication with a liquid-dispensing chamber when said nozzle is cut off from said dispensing chamber, the combination comprising liquid-spreading means supported by said container filling nozzle, freely movable sealing means slidably cooperating with said liquid spreading means, said sealing means and said liquid spreading means forming an enclosure for said filling nozzle discharge opening at one end limit of said sealing means movement, the magnitude of the interfaces in said enclosure being such that gravitational flow of the liquid contained in the nozzle therethrough is prevented by the surface tension of said liquid.

8. In an apparatus for preventing the gravitational flow of liquid through the discharge opening of a container-filling nozzle, the combination comprising liquid spreading means having an upper tubular portion detachably mounted and telescopically received on said filling nozzle periphery, a shank portion depending from said tubular portion periphery, and a tongue portion joined to the lower end limit of said shank portion of substantially the same cross-sectional area as said nozzle discharge opening in concentric, spaced apart relationship therewith, and reciprocally movable sealing means slidably engaging said shank portion and abutting said tongue portion at one end limit of said reciprocal movement; said liquid spreading means, shank portion and tongue portion and said reciprocally movable sealing means cooperating to form a member covering said nozzle discharge opening, the interfaces effected at the shank, tongue and sealing means points of cooperation which are contained in said member being such that gravitational fluid flow therethrough is prevented by the surface tension of said liquid contained in said nozzle.

References Cited in the file of this patent

UNITED STATES PATENTS

| | | |
|---|---|---|
| 525,744 | Roth | Sept. 11, 1894 |
| 1,775,719 | Germont | Sept. 16, 1930 |
| 2,034,921 | Phillips et al. | Mar. 24, 1936 |
| 2,121,065 | Anderson | June 21, 1938 |
| 2,666,565 | Barnes et al. | Jan. 19, 1954 |